March 15, 1960     E. PARKER     2,929,059
RADIO ANTENNAE SYSTEMS

Filed March 14, 1956     4 Sheets-Sheet 1

INVENTOR
E. PARKER
By Mawhinney & Mawhinney
ATTYS

March 15, 1960     E. PARKER     2,929,059
RADIO ANTENNAE SYSTEMS
Filed March 14, 1956     4 Sheets-Sheet 2
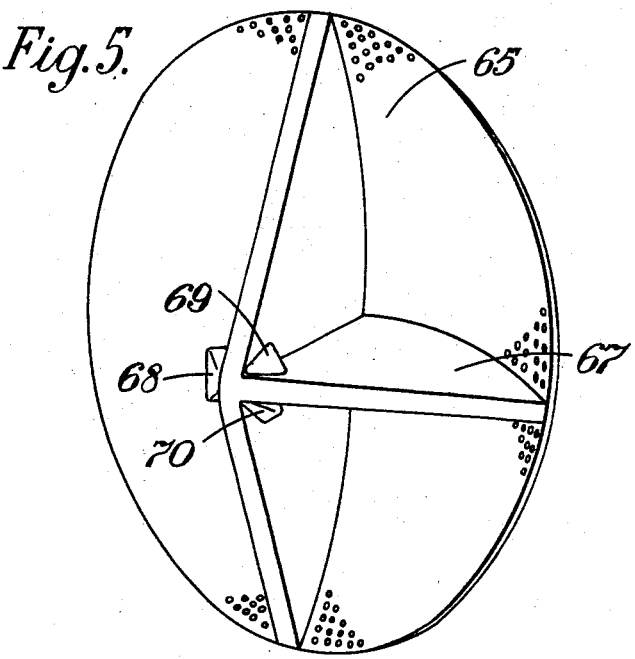
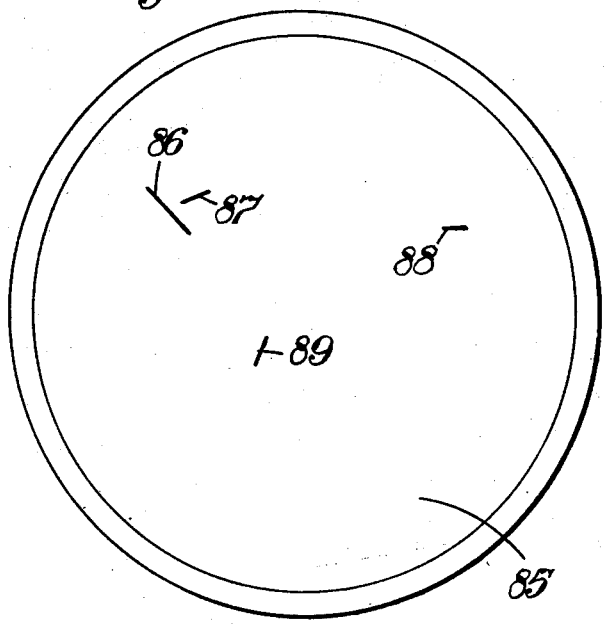
INVENTOR
E. PARKER
By Mawhinney & Mawhinney
ATTYS.

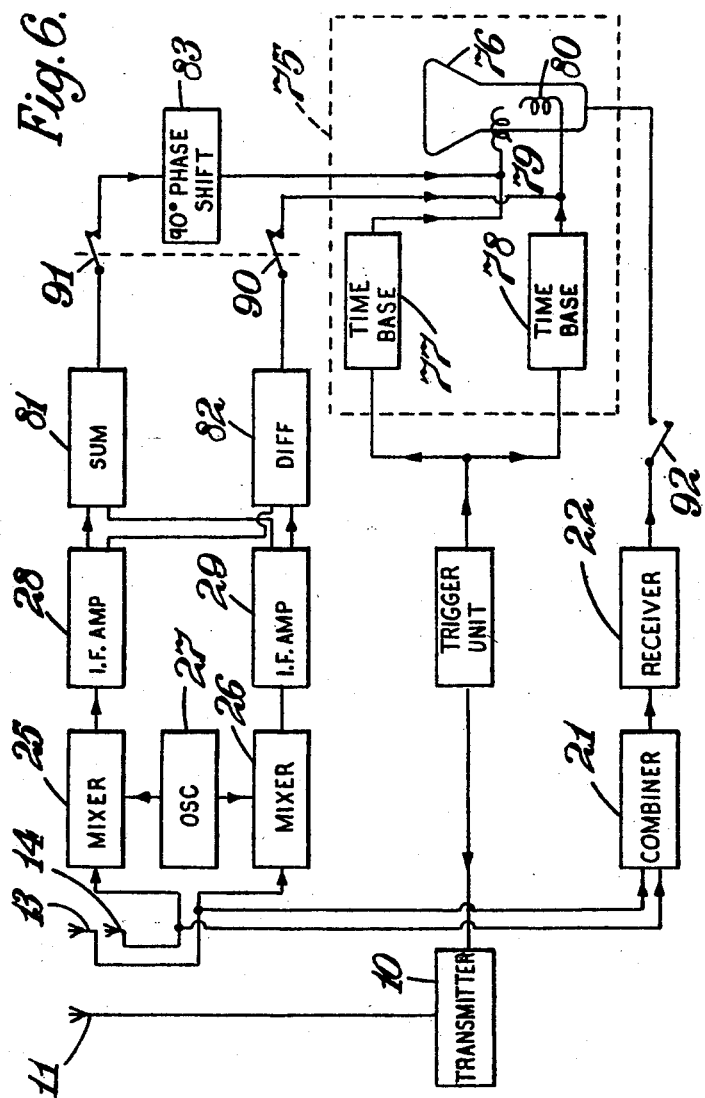

March 15, 1960  E. PARKER  2,929,059
RADIO ANTENNAE SYSTEMS
Filed March 14, 1956  4 Sheets-Sheet 4
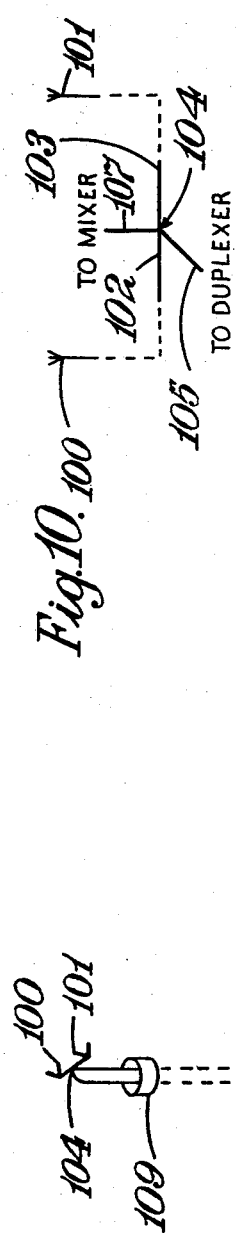
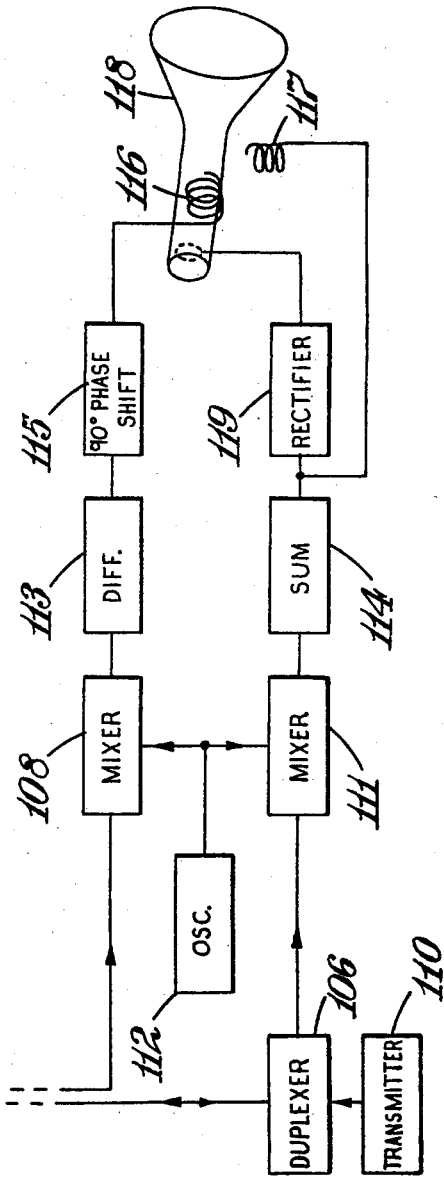
INVENTOR
E. PARKER
ATTYS

United States Patent Office 2,929,059
Patented Mar. 15, 1960

2,929,059

RADIO ANTENNAE SYSTEMS

Eric Parker, London, England, assignor to The Decca Record Company Limited, London, England, a British company Application March 14, 1956, Serial No. 571,485

Claims priority, application Great Britain March 14, 1955

8 Claims. (Cl. 343—16)

This invention relates to radio antennae systems for the accurate determination of the direction of a received signal and is applicable, for example, to antennae systems for use in radar systems for determining the bearing or angle of elevation of received signals.

According to this invention, a radio receiving antenna system comprises two antennae of which at least one has directional properties, the two antennae being spaced apart so that a phase difference exists between received signals dependent on the direction from which the signals are received. Preferably the two antennae both have directional properties, which properties may conveniently be similar, and are mounted so as to have the axes of their beams parallel. Considering, for example, a case where the angle of elevation of a received signal is to be measured, the two antennae would be positioned so that the axes of their beams are parallel and at a suitable angle of elevation such that there is substantially no component in the received signals reflected from the ground. One antenna may conveniently be mounted immediately above the other so that the phase relationship between the two received signals will depend on the angle of elevation. By this means it is possible to measure the angle of elevation accurately with respect to the elevation of the beam axes.

Thus according to a further feature of the invention, a radio receiving antenna system for determination of the angle of elevation of a received signal comprises two directional antennae, preferably having similar directional properties, the two antennae being mounted so as to have the axes of their beams parallel to one another and directed upwardly at an angle of elevation such that there is substantially no component in the received signals reflected from the ground and the two antennae being spaced one above the other so that a phase difference exists between received signals dependent on the elevation from which the signals are received.

Preferably the antennae are of the kind having a single main beam in order to avoid any ambiguities. For obtaining maximum angular discrimination, the spacing of the two antennae should be as great as possible but, in order to avoid ambiguity this spacing must be limited so that the phase relationship of signals within the width of the beam varies by an amount not exceeding $2\pi$ radians. Thus, for example, in an arrangement for receiving signals of a predetermined frequency wherein each of the antennae has a single main beam which is symmetrical about its axis in the required plane of measurement and which has a maximum effective width in that plane of $n$ degrees, the antennae may be spaced apart in that plane a distance such that the phase relationship between the received signals varies from $+\pi$ radians for signals received from $$\frac{n}{2}$$

degrees on one side of the axis of the beam to $-\pi$ radians at $$\frac{n}{2}$$

degrees at the other side of the axis of the beam.

Each of said antenna may comprise a reflector for reflecting the received signals on to a receptor element (such as a horn, dipole or the like). It will be noted that the antennae need not have a beam symmetrical about the axis and the invention can be applied, for example, to antennae having cosecant-squared coverages or other forms of beam.

In one arrangement the receiving antenna system comprises a parabolic reflector surface with a non-reflecting partition extending outwardly from the reflector surface in an axial plane to divide the reflector surface into two separate reflectors and two separate receptor elements for separately receiving the signals reflected from said separate reflectors. Each receptor element may comprise a horn with a waveguide feed and conveniently this waveguide feed may be arranged within said non-reflecting partition, the partition being made sufficiently thick for this purpose.

According to a further feature of the invention, a direction determining radio receiving system comprises an antenna system as described above in combination with phase determining means for determining the phase relationship between the signals received by the two antennae.

The invention finds particular application for measuring the angle of elevation of received radar signals and, according to a further feature of the invention, radar apparatus comprising a transmitter and echo-responsive receiver may be provided with a direction determining radio receiving system as descrbed above, there being provided a range-gate for selecting the received signals to be applied to the phase indicator. The radar apparatus may be provided with a separate transmitting antenna or the two receiving antennae may be fed in parallel by the transmitter. In radar apparatus for determining the angle of elevation of received signals, the two receiving antennae would preferably be mounted with their beams at an angle of elevation such that no signals reflected from the ground would be received by the antennae.

The antennae for an elevation-determining radar would normally be made directional in azimuth as well as in elevation and the antennae system may be made rotatable to enable the elevation of targets at different azimuths to be measured. Conveniently the antennae system may be made continuously rotatable and an azimuth-gate provided to enable selected signals to be applied to the phase determining means. The range-gate and aximuth-gate may be controlled automatically in accordance with the movements of a joystick-controlled marker on a plan display, which plan display may be derived either from the same radar or another radar.

In one embodiment of the invention, elevation-determining radar apparatus comprises a transmitter arranged to transmit repetitively short-duration radio-frequency pulses, a receiving antenna system comprising two directional antennae having single main beams, the two antennae being mounted so as to have the axes of their beams parallel to one another and directed upwardly at an angle such that there is substantially no ground-reflected component in the received signals and the two antennae being spaced one above the other so that a phase difference exists between received signals at the two antennae dependent on the elevation from which the signals are received, and means for determining the phase relationship between the signals received at the two receiving antennae from each target. The means for determining the phase relationship between the signals received at the two antennae may comprise a phase discriminator coupled to an indicator for indicating the phase relationship of the signals applied to the discriminator and a gating circuit for applying, to said discriminator, only echo signals from targets between adjustable pre-selected range limits.

Provided the two antennae have similar directional properties, for determining the phase relationship between two received radar signals, conveniently the two signals are heterodyned by a common local oscillator and then amplified by intermediate frequency amplifiers having matched phase characteristics. The phase difference of the two intermediate frequency signals may then be determined in the known manner. For example, provided the gains of the intermediate frequency amplifiers are equal, the phase difference may be measured directly by measuring the amplitude ratio of the vector sum and difference of the two intermediate frequency signals. In order, however, to avoid the necessity of matching the gain of the two amplifiers, the phase difference between the two signals may be determined by means of phase discriminators of the kind described, for example, in British patent specifications Nos. 620,507 and 624,042 which discriminators produce two signals of amplitudes proportional to the sine and cosine of the phase angle. Such signals may be applied to the X and Y plates of a cathode ray tube so as to give a deflection of the cathode ray beam at an angle corresponding to the angle of elevation. Preferably a cathode ray tube with an after-glow screen is used so that the information is stored. Such a cathode ray tube indicator may be provided with a cursor movable so as to be capable of being set at an angle corresponding to the indication and this cursor may be mechanically connected to a simple form of computer which is coupled also to the range-gate control. Since the setting of the cursor would correspond to the measured angle of elevation of the received signal and since the range of the target is measured by the range-gate setting, the computer from the cursor angle and from the range-gate setting may be arranged to indicate the height of the target.

A radar display may be provided similar to a plan position indicator but in which each echo is displayed, not as a dot, but as an inclined bar whose centre marks the position of the echo and whose inclination indicates its elevation. To produce such a display, there may be provided a cathode ray tube indicator having a radial time-base scanned repetitively in synchronism with the transmitted pulses and rotated in synchronism with the rotation of the antenna and phase determining means comprising circuit means for producing, for each target echo, two alternating current signals having the same phase and having amplitudes representative of the sine and cosine respectively of an angle dependent on the phase relation between the signals at the two receiving antenna and circuit means for applying said sine and cosine signals respectively to two orthogonal deflector means of the cathode ray tube so that the cathode ray beam, when the trace is in angular position corresponding to the bearing of a target, at an instant along that trace corresponding to the range of the target, is oscillated in a direction corresponding to the elevation of the target.

The circuit means for producing the two alternating current signals may comprise a pair of heterodyne frequency changers having a common local oscillator for separately changing the frequencies of the signals received by the two receiving antennae to produce separate intermediate frequency signals, two intermediate frequency amplifiers for amplifying separately said intermediate frequency signals, said amplifiers having gains matched such that the amplifier outputs have amplitudes proportional to the amplitudes of the received signals, a first combining circuit for producing an output representative of the vector sum of the two amplifier outputs, a second combining circuit for producing an output representative of the vector difference of the two amplifier outputs and a circuit for phase shifting the vector sum and vector difference to bring them into phase with one another.

Alternatively, the outputs representative of the vector sum and the vector difference may be rectified to produce two direct voltages and the ratio of these two voltages (which ratio is dependent of the required phase difference) used to control the display. In this arrangement, however, due to the rectification, if ambiguity in the display is to be avoided, the total phase variation between the received signals must be within the limits of $$+\frac{\pi}{2} \text{ to} -\frac{\pi}{2}$$

radians.

In yet another arrangement for determining the phase relationship of the received signals, which can be used if the received signals are equal in amplitude or can be made to be equal, the vector sum and the vector difference of the two received radio frequency signals are obtained at the radio frequency by the use of, for example, of known waveguide components (e.g. a hybrid T junction). These sum and difference signals are then heterodyned using a common local oscillator and the resultant intermediate frequency signals, after amplification, may be used, in the same way as described above, as the previously described intermediate frequency signals having amplitudes representative of the sine and cosine of an angle dependent on the phase relation between the received signals.

Various forms of antenna system may be used for the purposes of the present invention. For an elevation determining radar system, there may be used a parabolic reflector of circular form divided by a non-reflecting horizontal partition extending forwardly from the reflector. A pair of horns may be mounted one above and one below this partition for picking up signals received on the two halves of the reflector and reflected into the horns. These two horns may be fed in parallel by the radar transmitter. In another arrangement for an elevation determining radar system, a parabolic reflector of circular form is used, this reflector being divided in two halves by a vertical non-reflecting partition extending through the centre of the projector and projecting forwardly therefrom. One half of the reflector is then used as the transmitter antenna and is provided with a suitable horn feed. The other half of the reflector is divided equally into two parts by means of a horizontal non-reflecting partition extending from the centre of the first partition in a radial direction so as to form two separate receiving antennae which are provided with separate horns.

Considered from another aspect, radar apparatus for determining the angular direction, in one plane, of an echo-giving target comprises three antennae, a transmitter arranged to feed one of the antennae and phase comparison means for comparing the phase of echo signals simultaneously received on the other two antennae, the two viewing antennae being spaced part in said plane and at least two of the three antennae having directional properties in said plane with the three directional patterns overlapping so that a phase difference exists between received signals dependent on the direction, in said plane, from which the signals are received. Preferably, in order to avoid ambiguity, the spacing of the receiving antennae is made such that the phase difference between received signals within the overlap of the beams has limits between $+\pi$ and $-\pi$ radians.

In the following description, reference will be made to the accompanying drawings in which:

Figure 5 is a perspective view of an alternative form of antenna system for use in the arrangement of Figure 1;

Figure 6 is a block diagram of a modified form of the apparatus of Figure 1 embodying a different form of height display unit;

Figure 7 is a diagram showing the form of display on the height display unit of Figure 6;

Figure 8 is a diagram illustrating the relationship between the form of echo display and the angle of elevation in the arrangement of Figure 7;

Figure 9 is a block diagram of part of another form of radar apparatus; and

Figure 10 is a diagram showing in further detail part of the apparatus of Figure 9.

Figure 1:
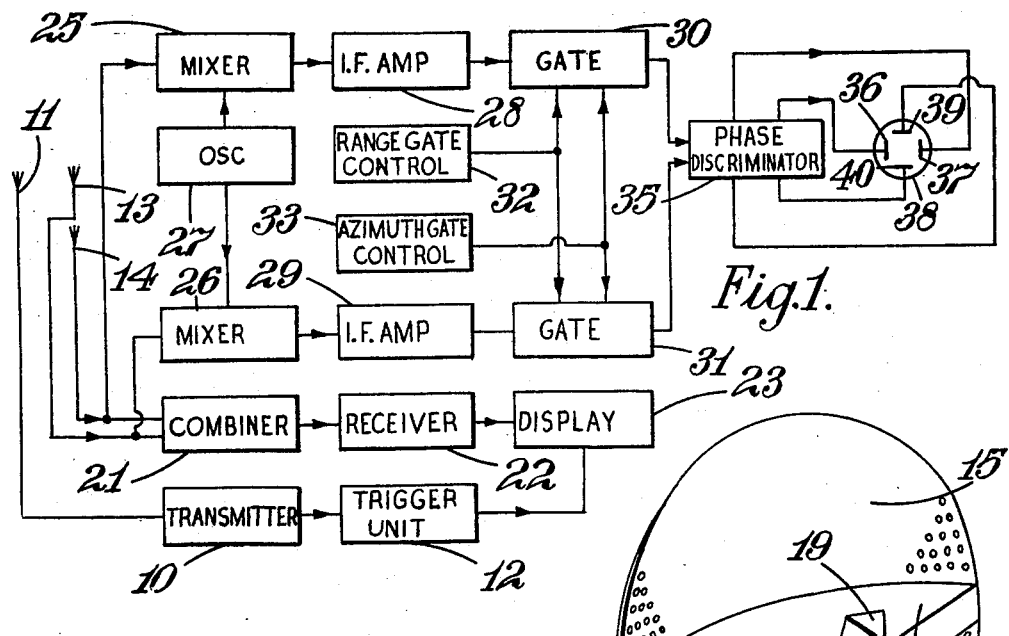
Figure 1 is a block diagram of one form of elevation-determining radar apparatus.

Referring to Figure 1 there is illustrated diagrammatically a pulse radar apparatus having a transmitter 10 coupled to a transmitting antenna 11 to transmit a repetitive series of short duration radio frequency pulses, the repetition rate being determined by trigger pulses from a trigger unit 12. The transmitting antenna 11 is a directional antenna having a beam width in the vertical plane slightly greater than the required range of elevation measurement of the radar system. In a typical case the radar system may be required to measure angles of elevation between 0° and 6° and in this case the transmitting antenna would have a beam width of slightly more than 6° and would be directed upwardly so that substantially no radiation takes place in a direction which would give ground returns. The transmitting antenna is also beamed in the horizontal plane and the antenna is continuously rotated in the azimuth plane in synchronism with the receiving antenna system to be described later.

Figure 2:
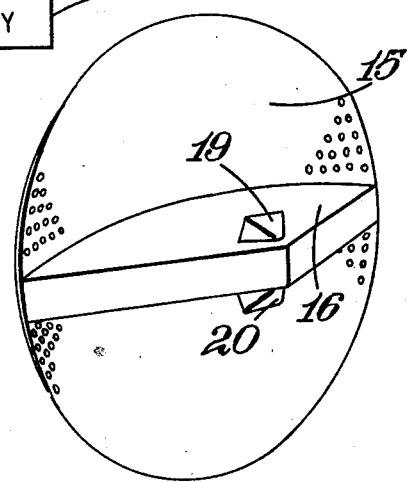
Figure 2 is a perspective view of a receiving antenna system for use in the apparatus of Figure 1.
Figure 3:
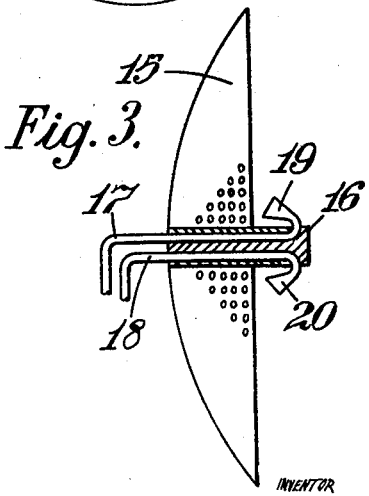
Figure 3 is a vertical section through the antenna system of Figure 2.

The receiving antenna system is represented diagrammatically in Figure 1 as comprising two antennae 13, 14. The construction of this antenna system is shown in Figures 2 and 3 and comprises a circular parabolic dish 15 having a non-reflecting partition 16 extending horizontally across the dish through the axis thereof to divide the dish into two separate reflector surfaces. In this partition there are arranged two waveguide feeds 17, 18 to a pair of horns 19, 20 respectively, one horn 19 being arranged to receive signals reflected from the half of the parabolic surface 15 above the partition 16 and the other horn 20 being arranged to receive signals reflected only from the lower half of the parabolic surface 15. The horns 19 and 20 are similar in construction so that the receiving antenna system comprises two separate antennae having similar directional properties but spaced apart in the vertical plane. The two antennae are arranged to have beam widths both in the horizontal and vertical planes generally similar to those of the transmitting antennae and the receiving antennae is arranged so that the effective spacings of the two antennae in the vertical direction is such that the phase relationship between received signals within the width of the beam varies by an amount not exceeding $2\pi$ radians.

Referring again to Figure 1, the signals from the two receiving antennae 13, 14 are fed to a combiner unit 21 which combines the two sets of received signals before they are fed to a receiver 22 and a display unit 23. The receiver 22 and the display 23 may be of conventional form, for example it may be a plan position indicator display in which the received signals are arranged to modulate the brightness of a radial range-scan trace on a cathode ray tube screen, which trace is rotated in synchronism with the rotation of the antennae.

In addition to being fed to the combiner unit 21, the signals from the two receiving antennae 13, 14 are separately fed to a pair of mixers 25, 26 where they are heterodyned with signals from a common local oscillator 27 to produce separate intermediate frequency signals which are amplified by intermediate frequency amplifiers 28, 29. The outputs from these two amplifiers 28, 29 are fed respectively to two gating circuits 30, 31. These gating circuits are for the purpose of selecting only the signals corresponding to a particular echo of which the height is to be determined and, for this purpose, each of the two gates is controlled by a range gate control 32 and an azimuth gate control 33. The range gate control may be arranged, for example, to pass all responses within plus or minus one mile of an adjustable selected range. The width of the range gate may, however, be made adjustable also if desired. Similarly the azimuth gate control would pass only responses within preselected adjustable azimuth limits and the width of this gate may also be made adjustable if desired. Separate range and azimuth selector control knobs may be provided for manual operation but, in some cases, it may be more convenient, for setting the range and azimuth gate controls, to provide a joy stick controlled marker on a plan display which might be of the display of unit 23 or might be a display from another completely separate radar apparatus.

The outputs from the two gates 30, 31 are fed to a phase discriminator 35 which may be constructed in the manner described and claimed in either British patent specification No. 620,507 or No. 624,042. Such a phase discriminator produces two output signals of amplitudes proportional to the sine and cosine of the phase angle between the two inputs. One of these output signals is applied to the X plates 36, 37 of a cathode ray tube 38 whilst the other output signal is applied to the Y plates 39, 40 so as to give a deflection of the beam of the tube 38 across the screen at an angle corresponding to the angle of elevation. This cathode ray tube 38 is preferably a tube having an afterglow screen so that the information displayed thereon is stored.

By using a phase discriminator of the kind described in the aforementioned specifications, there is avoided any necessity for matching the gains of the two amplifiers 28, 29. Provided however that these two amplifiers were matched so that the amplitudes of their outputs were proportional to the amplitudes of the radio frequency signals at the antennae 13, 14, it would be possible to use a simpler form of phase discriminator comprising a first combining unit for producing an output proportional to the vector sum of the outputs of amplifiers 28, 29 and a second combining unit for producing an output proportional to the vector difference of the outputs of the amplifiers 28, 29. These two combining units would thus produce intermediate frequency signals having amplitudes of ratio proportional to the sine and cosine of half the phase difference angle of the radio frequency inputs. These intermediate frequency signals, after one has been shifted in phase by 90°, may be applied directly to the deflector plates of the tube 38.

Figure 4:
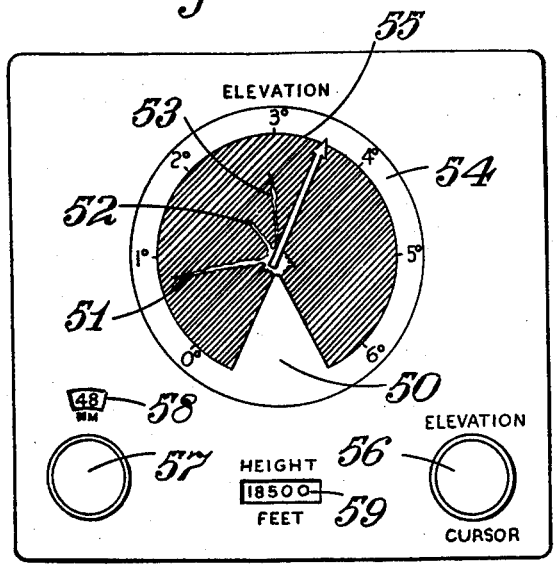
Figure 4 is a view of a height indicator unit for use in the arrangement of Figure 1.

The form of display on the cathode ray tube 38 is illustrated in Figure 4 which shows the appearance of this form of height indicator. On the screen 50 of the cathode ray tube there are shown three echo responses 51, 52, 53 at different angles of elevation. The angles of elevation of these various responses may be read off from a scale 54 provided around the screen of the tube. In front of the screen there is provided a mechanically rotatable cursor which is controlled by a control knob 56. The height indicator also has a range setting knob 57 controlling a range indicator 58. This range setting knob conveniently is coupled mechanically to the aforementioned range gate so that the range indicated on the indicator 58 corresponds to the setting of the range gate.

The operation of the apparatus of Figure 1 will have been clear from the foregoing description. Echoes received by the receiving antennae 13, 14 will have a phase difference depending on the angle of elevation of the incoming signals and this phase difference is determined by the phase discriminator 35 and controls the angular position of the display on the screen of the cathode ray tube 38.

A simple form of mechanical computer may be provided to indicate, by means of an indicator 59, the height corresponding to the setting of the elevation cursor control 56 and the range knob 57 so that, if the cursor control knob 56 is employed to set the cursor 55 over an echo response on the screen 50 of the tube 38, then the height of the target giving this echo is indicated automatically by the indicator 59.

Instead of using separate transmitting and receiving antennae, the two receiving antennae 13, 14 might be used also for transmitting the pulses from the transmitter 10, the two horns 19, 20 being fed in parallel from the transmitter, thereby obviating the need for a separate transmitting antenna which has to be rotated in synchronism with the receiving antennae.

Figure 5 illustrates in perspective another form of combined transmitting and receiving antenna system which comprises a circular parabolic reflector 65 which is divided by a vertical non-reflecting partition 66 extending diametrically across the whole width of the reflector 65. A second nonreflecting partition 67 extends radially from the centre of the reflector 65 to divide one of the halves thereof into two quarters. The undivided half of the reflector is used as for the transmitting antenna, a horn 68 being provided for feeding signals from the transmitter onto this half of the reflector. The two portions of the other half of the reflector are used as the two separate receiving antennae, separate horns 69, 70 being provided for receiving the signals reflected from the two portions of the reflector on either side of the partition 67.

Figure 6 illustrates a modification of the arrangement of Figure 1. In the arrangement of Figure 6, a pulse transmitter 10 transmits short duration radio frequency pulses from a rotatable directional transmitting antenna 11, the pulses from this transmitter being synchronised with trigger pulses from a trigger unit 12 as in the arrangement of Figure 1. Two rotatable directional receiving antennae 13, 14, also as in the arrangement of Figure 1, are connected respectively to two mixers 25, 26 where the received signals are heterodyned with the output of a common local oscillator 27 to produce two separate intermediate frequency signals which are amplified by intermediate frequency amplifiers 28, 29. The receiving and transmitting antennae are rotated in synchronism and the receiving antennae may be constructed as shown in Figures 2 and 3 or as in Figure 5. In the arrangement of Figure 6 there is provided a display unit 75 having a cathode ray tube 76 on the screen of which a time-base trace is rotated in synchronism with the rotation of the transmitting and receiving antennae. This rotation of the trace is effected by appropriate scanning deflection currents fed from two time base generators 77, 78 to fixed deflection coils 79, 80. The saw-tooth current scans from the two time base generators are triggered from the aforementioned trigger unit 12 so that the radial traces start at the same times as the pulses are radiated from the antenna 11. It will be seen that this scanning system is similar to that used in radar plan position indicator displays of the kind employing fixed deflection coils for deflecting the beam of a cathode ray tube.

The output signals from the two intermediate frequency amplifiers 28, 29 are fed to a first combining unit 81 to produce a first output proportional to the vector sum of the outputs of the two amplifiers 28, 29 and are also fed to a second combining unit 82 to produce a second output proportional to the vector difference of the outputs of the two amplifiers 28, 29. These two amplifiers have their gains matched so that, in the manner previously described, the combining units 81, 82 produce outputs representative of the sine and cosine of half the phase difference angle of the radio frequency signals at the antennae 13, 14. These signals representative of the sine and cosine, which are at the intermediate frequency, are phase shifted relatively to one another by 90° by means of a phase shifter 83 and are then mixed respectively with the time-base scanning signals from the time base generators 77, 78. This mixing of the two combined intermediate frequency signals with the scanning deflection signals produces a display of the form shown in Figure 7 in which there is shown the screen 85 of the cathode ray tube 76 and a number of echo signals 86 to 89 displayed on the screen. The centre of each echo signal is at the instantaneous position of the cathode ray beam determined by the deflection scanning signals from the time base generators 77, 78 and hence represents the range and bearing of the echo producing target. The display on the screen is thus, in effect, a plan position indictor display modified in that the length of each echo signal on the display depends on the amplitude of the signals from the amplifiers 28, 29 and hence indicates the amplitude of the received signal. The angular aspect of each signal depends on the phase relationship between the outputs from the two amplifiers 28, 29 and hence indicates the elevation of the target. In a typical arrangement this relationship between elevation and aspect of the signal may be in the form indicated in Figure 8 in which a horizontal line indicates zero elevation and the slope gradually increases in an anti-clockwise direction through an angle of 135° proportional to the angle of elevation. It will be seen therefore that this arrangement provides a plan position display in which each target is indicated in a manner which shows its angle of elevation. The display may be off-centred if desired, that is to say, the centre of rotation of the trace need not coincide with the centre of the screen.

The form of plan position display shown in Figure 7 may be of great help in analysing the situation if there are many targets since much height information is clearly apparent without reference to a height indicator of the kind shown in Figure 4. Switch means 90, 91 may be provided for cutting off the signals from the combining units 81, 82 to the time base deflection coils and a further switch 92 provided for applying, to the grid to the cathode circuit of the cathode ray tube 76, signals from a receiver 22 which is fed with the outputs from the two antennae 13, 14 which are combined in a combiner 21. It is thus possible to use the cathode ray tube 76 as a conventional plan position display, the signals being displayed as brightness modulations, but, when required, the form of display shown in Figure 7 may be obtained by operation of the switches 90, 91 and 92, which switches may be ganged together for simultaneous operation.

Figure 9 is a block diagram of yet another form of pulse radar apparatus having two rotatable spaced antennae 100, 101. As is shown more clearly in Figure 10, these two antennae are connected respectively by waveguides to the two symmetrical arms 102, 103 of a magic T waveguide junction 104. Of the other two arms 105, 106, the arm 105 is connected to a duplexer 107 and the arm 106 is connected to a mixer 108, these two connections being effected through a double rotating joint 109 (Figure 9). As is well known, with a magic T, if two inputs are fed into the symmetrical arms 102, 103, the vector sum of these inputs is obtained from one of the other arms (105 in the present case) and the vector difference is obtained from the fourth arm 107. It will readily be appreciated that other forms of hybrid waveguide junctions may be employed in place of the magic T 104.

The duplexer 106 serves for feeding radio-frequency pulse signals from a transmitter 110 into the arm 105 so that the signals are transmitted in phase from the two antennae 100, 101 and to feed the incoming vector sum signals from the arm 105 to a second mixer 111. The two mixers 108, 111 serve to mix the received vector difference and vector sum signals respectively with the output of a common local oscillator 112 to produce separate intermediate frequency signals which are amplified by intermediate frequency amplifiers 113, 114.

These intermediate frequency signals from the amplifiers 113, 114 might be passed through gating circuits similar to those of Figure 1 and used to provide a display similar to that of Figure 4. In the arrangement of Figure 9, however, these signals are shown as being phase shifted relatively to one another by 90° by a phase shifter 115 and then applied separately to auxiliary deflection coils 116, 117 arranged for orthogonal deflection of the beam of a cathode ray tube 118. This beam is also separately scanned in any suitable manner in synchronism with the radiated pulses and the rotation of the antennae by separate deflection coils (not shown). For example, these separate deflection coils may be controlled from separate time-base generators in the manner described with reference to Figure 6. To make the various echo responses visible on the screen of the tube 118, part of the output from the intermediate frequency amplifier 114 is rectified by a rectifier 119 and then applied to the grid-to-cathode circuit of the cathode-ray tube 118.

It will be seen that, in the arrangement of Figures 9 and 10, the signals proportional of the sine and cosine of an angle, which is representative of the angle to be measured, are produced at the radio frequency so that phase-matching of the intermediate frequency stages is much less important. It will be noted that instead of introducing the necessary 90° phase shift by an intermediate frequency phase shifter 115, this phase shift might be introduced at the radio frequency.

It will be noted that in all the radar systems described with specific reference to the accompanying drawings, the transmitting antenna and the two receiving antennae all have directional patterns. This is most generally desirable from the point of view of efficiency and overall gain of the system but it would be possible to use only one or two directional antennae, the other antenna or antennae being non-directional. In elevation-determining radar apparatus, it is necessary to avoid ground reflections in the received signals and, in this case, either the transmitting antenna or both the receiving antennae must be directional but, in the case for example of the determination of the azimuthal bearing of received signals any one or more of the antennae may be directional.

I claim:

1. In radar apparatus, the combination of two directional receiving antennae having directional overlapping beams, which antennae are spaced apart so that a phase difference exists between received signals dependent on the direction from which the signals are received, a phase discriminator for producing output signals representative of the sine and cosine of the phase angle between two input signals to the discriminator, circuit means for applying to the discriminator inputs two alternating currents derived from signals received respectively at the two receiving antennae and having the same relative phase, and a cathode ray tube indicator with fixed orthogonal deflector means coupled respectively to the sine and cosine signal outputs of the discriminator to produce a deflection of the cathode ray beam in a direction corresponding to the direction from which the signals are received at the antenna.

2. The combination as claimed in claim 1 wherein said antennae are arranged each to produce a single main beam, the two beams having similar directional properties and their axes parallel, and wherein said antennae are spaced so that the phase difference between received signals within the angular width of the beams varies by an amount not exceeding $2\pi$ radians.

3. In radar apparatus, the combination of two directional receiving antennae having directional beams with their axes parallel which antennae are spaced apart so that a phase difference exists between received signals dependent on the direction from which the signals are received, a phase discriminator for producing output signals representative of the sine and cosine of an angle proportional to the phase angle between two input signals to the discriminator, a gating circuit arranged to apply to the discriminator signals received by the two antennae from targets between pre-selected range limits, and a cathode ray tube indicator with fixed orthogonal deflector means coupled respectively to the sine and cosine signal outputs of the discriminator to produce a deflection of the cathode ray beam in a direction corresponding to the direction from which the signals are received at the antenna.

4. Radar apparatus comprising a transmitter arranged to transmit repetitively short duration radio frequency pulses, two directional receiving antennae having directional overlapping beams, which antennae are spaced apart so that a phase difference exists between received signals dependent on the direction from which the signals are received, a gate pulse control circuit arranged to produce a pulse at an adjustable time within the pulse repetition cycle, phase determining means for producing output signals representative of the sine and cosine of an angle proportional to the phase angle between two signals applied to two input circuits, a cathode ray tube indicator with fixed orthogonal deflector means coupled respectively to the sine and cosine signal outputs of the discriminator to produce a deflection of the cathode ray beam in a direction corresponding to said phase angle, and means for feeding signals from the two receiving antennae respectively to said two input circuits, which means include two gates arranged to be opened by the pulses from said gate pulse control circuit.

5. Elevation-determining radar apparatus comprising a transmitter arranged to transmit repetitively short-duration radio-frequency pulses, a receiving antenna system comprising two directional antennae having single main beams, the two antennae being mounted so as to have the axes of their beams parallel to one another and directed upwardly at an angle such that their is substantially no ground-reflected component in the received signals and the two antennae being spaced one above the other so that a phase differfence exists between received signals at the two antennae dependent on the elevation from which the signals are received, a phase discriminator for producing output signals representative of the sine and cosine of an angle proportional to the phase angle between two signals applied to two discriminator input circuits, a cathode ray tube indicator with fixed orthogonal deflector means coupled respectively to the sine and cosine signal outputs of the discriminator to produce a deflection of the cathode ray beam in a direction corresponding to said phase angle, and a gating circuit for applying to said discriminator input circuits from said two antennae only echo signals from targets between adjustable pre-selected range limits.

6. Elevation-determining radar apparatus comprising a transmitter arranged to produce repetitively short-duration radio frequency pulses, a transmitting antenna directional in the azimuthal plane and rotatable in that plane, which antenna is coupled to said transmitter to radiate said pulses, a receiving antenna system comprising two directional antennae having single main beams, which receiving antennae are directional in the azimuthal plane and rotatable in that plane and are mounted so as to have the axes of their beams parallel to one another and directed upwardly at an angle such that there is substantially no ground-reflected component in the received signals and which two receiving antennae are spaced one above the other so that a phase difference exists between received signals at the two antennae dependent on the elevation from which the signals are received, means for rotating said transmitting and receiving antennae so that their beams are swept in the azimuthal plane with the beams aligned in bearing, a cathode ray tube indicator having a radial time-base scanned repetitively in synchronism with the transmitted pulses and rotated in synchronism with the rotation of the antennae, circuit means for producing, for each target echo, two alternating current signals having the same phase and having amplitudes representative of the sine and cosine respectively of an angle dependent on the phase relation between the signals at the two receiving antennae and circuit means for applying said sine and cosine signals respectively to two orthogonal deflector means of the cathode ray tube so that the cathode ray beam, when the trace is in angular position corresponding to the bearing of a target, at an instant along that trace corresponding to the range of the target, is oscillated in a direction corresponding to the elevation of the target.

7. Elevation-determining radar apparatus as claimed in claim 6 and having two receiving antennae with similar directional properties wherein the circuit means for producing the two alternating current signals comprise a pair of heterodyne frequency changers having a common local oscillator for separately changing the frequencies of the signals received by the two receiving antennae to produce separate intermediate frequency signals, two intermediate frequency amplifiers for amplifying separately said intermediate frequency signals, said amplifiers having gains matched such that the amplifier outputs have amplitudes proportional to the amplitudes of the received signals, a first combining circuit for producing an output representative of the vector sum of the two amplifier outputs and a second combining circuit for producing an output representative of the vector difference of the two amplifier outputs.

8. Elevation-determining radar apparatus as claimed in claim 6 wherein the receiving antennae are arranged so that the two receiving beams have similar directional properties and wherein said receiving antennae are spaced so that the phase difference between received signals within th angular overlap of the beams has limits between $+\pi$ and $-\pi$ radians.

References Cited in the file of this patent

UNITED STATES PATENTS

| | | |
|---|---|---|
| 2,416,088 | Deerhake | Feb. 18, 1947 |
| 2,608,683 | Blewett | Aug. 26, 1952 |